United States Patent
Kawakami

(10) Patent No.: US 11,139,116 B2
(45) Date of Patent: Oct. 5, 2021

(54) GEL ELECTROLYTIC CAPACITOR

(71) Applicant: Nippon Chemi-Con Corporation, Tokyo (JP)

(72) Inventor: Junichi Kawakami, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 7 days.

(21) Appl. No.: 16/649,465

(22) PCT Filed: Sep. 25, 2018

(86) PCT No.: PCT/JP2018/035532
§ 371 (c)(1),
(2) Date: Mar. 20, 2020

(87) PCT Pub. No.: WO2019/065661
PCT Pub. Date: Apr. 4, 2019

(65) Prior Publication Data
US 2020/0258691 A1    Aug. 13, 2020

(30) Foreign Application Priority Data

Sep. 28, 2017  (JP) .............................. JP2017-187953

(51) Int. Cl.
*H01G 9/025*  (2006.01)
*H01G 11/56*  (2013.01)
*H01G 9/15*  (2006.01)
*H01G 11/48*  (2013.01)

(52) U.S. Cl.
CPC ............ *H01G 9/025* (2013.01); *H01G 9/151* (2013.01); *H01G 11/48* (2013.01); *H01G 11/56* (2013.01)

(58) Field of Classification Search
None
See application file for complete search history.

(56) References Cited

U.S. PATENT DOCUMENTS

| | | | | |
|---|---|---|---|---|
| 2002/0102464 A1* | 8/2002 | Yoshida | ............ | H01M 10/0565 429/300 |
| 2002/0110739 A1* | 8/2002 | McEwen | ............... | H01M 4/133 429/324 |
| 2003/0124432 A1 | 7/2003 | Miura et al. | | |
| 2007/0042266 A1* | 2/2007 | Oh | ......................... | H01G 9/038 429/188 |
| 2011/0256456 A1* | 10/2011 | Jeon | .................. | H01M 10/0569 429/303 |
| 2016/0293337 A1 | 10/2016 | Sugawara et al. | | |
| 2017/0346129 A1* | 11/2017 | Stolyarov | .............. | H01G 11/40 |
| 2018/0034101 A1* | 2/2018 | Lee | ................... | H01M 10/0569 |
| 2020/0168945 A1* | 5/2020 | Koga | ..................... | H01G 11/12 |
| 2020/0258691 A1* | 8/2020 | Kawakami | ............. | H01G 9/151 |

FOREIGN PATENT DOCUMENTS

| | | |
|---|---|---|
| CN | 1692459 A | 11/2005 |
| CN | 102360951 A | 2/2012 |
| CN | 106449114 A | 2/2017 |
| JP | H04-73922 A | 3/1992 |
| JP | H05-175083 A | 7/1993 |
| JP | H10-55718 A | 2/1998 |
| JP | 2003-208816 A | 7/2003 |
| JP | 2003-223931 A | 8/2003 |
| JP | 2013-207096 A | 10/2013 |
| JP | 2016-197627 A | 11/2016 |
| JP | 2017-082061 A | 5/2017 |

OTHER PUBLICATIONS

Office Action dated Apr. 2, 2021, in Chinese Patent Application No. 201880059178.X.
International Search Report from International Patent Application No. PCT/JP2018/035532, dated Dec. 18, 2018.

* cited by examiner

*Primary Examiner* — Dion Ferguson
(74) *Attorney, Agent, or Firm* — SGPatents PLLC

(57) ABSTRACT

A gel electrolytic capacitor that can further improve withstand voltage is provided. The gel electrolytic capacitor includes: an anode foil; a cathode foil; and a gel electrolyte disposed between the anode foil and the cathode foil. The gel electrolyte consists of a polymer having three-dimensional (3D) network structure and an electrolyte solution held in said polymer. The polymer is formed by polymerizing 2-hydroxyethyl methacrylate or methacrylic acid. The electrolyte solution includes amines or quaternary cyclic amidinium.

14 Claims, No Drawings

GEL ELECTROLYTIC CAPACITOR

TECHNICAL FIELD

The present disclosure relates to a capacitor using gel electrolytes.

BACKGROUND ART

An electrolytic capacitor includes a valve action metal, such as tantalum or aluminum, as an anode foil and a cathode foil. The valve action metal is made into a shape of a sintered body or an etched foil, etc., to form an anode foil with an enlarged surface, and the enlarged surface has a dielectric oxide film. When liquid electrolyte solution is used as an electrolyte, the liquid electrolyte solution intervenes between the anode foil and the cathode foil. The electrolyte solution is in close contact with an uneven surface of the anode foil, and acts as a true negative electrode.

The electrolyte solution intervenes between the dielectric oxide film layer of the anode foil, and the cathode foil, and conducts ions between the anode foil and the cathode foil. Accordingly, conductivity and a temperature characteristic, etc., of the electrolyte solution largely affects electrical characteristics of the electrolytic capacitor, such as impedance, dielectric loss tangent (tan δ), and equivalent series resistance (ESR), etc. Also, the electrolyte solution restores deterioration of the dielectric oxide film formed on the anode foil, such as deteriorated portions and damaged portions, and affects a leakage current (LC) and a lifetime characteristic of the electrolytic capacitor.

Therefore, electrolyte solution which at least has high electric conductivity is appropriate for an electrolytic capacitor. However, when electric conductivity of the electrolyte solution is increased, a spark voltage tends to decrease, and there is a concern that a withstand voltage characteristic of the electrolytic capacitor might be lost. In terms of safety, it is desirable that the electrolytic capacitor has high withstand voltage to prevent short-circuit and firing even under hard conditions in which an abnormal voltage that exceeds a rated voltage is applied to the electrolytic capacitor. Also, the electrolytic capacitor using electrolyte solution has a concern of a liquid leak. If electrolyte solution leaks from the electrolytic capacitor, at worst, electronic devices around break.

To avoid disadvantages of the electrolyte solution, a solid electrolytic capacitor may be selected. For example, a capacitor with a solid electrolyte, which is obtained from ethylene glycol that is a solvent, an electrolyte salt, and polyacrylic acid and amine compounds that are a polymer, can be cited (For example, Patent Document 1). This solid electrolytic capacitor has high ion conductivity and high spark voltage. However, this solid electrolytic capacitor may not have enough high electric conductivity when compared to liquid electrolyte.

Accordingly, gel electrolyte having both properties of liquid and solid is considered. However, gelation of electrolyte by the combination of ethylene glycol and polyacrylic acid is difficult. Gelation of electrolyte by the combination of γ-butyrolactone and polyacrylic acid is also difficult. Therefore, an electrolytic capacitor in which electrolyte solution is gelated (made to have high viscosity) by adding polyvinyl alcohol instead of polyacrylic acid to reduce liquidity is suggested (for example, Patent Document 2).

CITATION LIST

Patent Document

Patent Document 1:JP H5-175083
Patent Document 2:JP H4-73922

SUMMARY

Problem to be Solved by the Invention

A gel electrolytic capacitor using polyvinyl alcohol has conductivity that is equivalent to capacitors which mainly use electrolyte solution, and has less possibility for liquid leak. However, it cannot be said that satisfactory value for a withstand voltage is indicated. Therefore, a gel electrolytic capacitor having more improved withstand voltage is desired.

The present disclosure is suggested to address the above described problem, and the objective thereof is to provide a gel electrolytic capacitor that can further improve withstand voltage.

Means for Solving the Problem

To address the above described problem, a gel electrolytic capacitor includes: an anode foil; a cathode foil; and a gel electrolyte disposed between the anode foil and the cathode foil, in which the gel electrolyte consists of a polymer having three-dimensional (3D) network structure and an electrolyte solution held in said polymer, the polymer having three-dimensional network structure is formed by polymerizing 2-hydroxyethyl methacrylate or methacrylic acid, and the electrolyte solution includes amines or quaternary cyclic amidinium.

The electrolyte solution may include carboxylic acid and ethylene glycol.

The electrolyte solution may include γ-butyrolactone, and the polymer may be 2-hydroxyethyl methacrylate.

The electrolyte solution may include a flame retardant.

A volume of a monomer may be 2.5 wt % to 55 wt % relative to a total volume of the gel electrolyte.

The polymer may include a crosslinking agent, and the crosslinking agent may be included in the gel electrolyte so that crosslinking degree of the polymer calculated by the below formula (1) is 45% or less.

$$\text{Crosslinking Degree (\%)}=\text{Crosslinking Agent Addition Amount (mol)/Monomer Addition Amount (mol)} \times 100 \quad (1)$$

The gel electrolyte may include a thickener.

Effect of Invention

According to the present disclosure, a withstand voltage of the gel electrolytic capacitor can be improved.

PREFERRED EMBODIMENT OF INVENTION (Gel Electrolytic Capacitor)

A gel electrolytic capacitor according to the present disclosure is a passive element which charges and discharges electric charge by capacitance. A surface of an anode foil is enlarged, and has porous structure. A surface of a cathode foil may also have porous structure. A dielectric oxide film is formed at least on a porous structure portion of the anode foil. The gel electrolytic capacitor includes a gel electrolyte between the anode foil and the cathode foil.

The gel electrolyte is formed of electrolyte solution and a 3D structure polymer holding said electrolyte solution. Monomers that would form a main chain of a gel network, a polymerization initiator to polymerize said monomers, and a crosslinking agent to crosslink said polymers are used as a gelation agent. Said monomers are polymerized and form a polymer, and said polymers are crosslinked to form 3D structure. This gel electrolyte intervenes between the anode foil and the cathode foil, is in close contact with the dielectric oxide film, and acts as a cathode foil which transfer electric charge of the foil.

A separator may be provided between the anode foil and the cathode foil, or the separator may be removed therefrom. The separator prevents a short-circuit of the anode foil and the cathode foil, and maintains the shape of the gel electrolyte. Therefore, the separator is not necessary as long as the gel electrolyte maintains a shape with thickness that is enough to separate the anode foil and the cathode foil. Even if separator is provided, a thin separator that contributes to downsizing and high capacity of the capacitor, a high density separator that has the effect of improving withstand voltage, and a low density separator that achieves low ESR (equivalent series resistance) is preferable.

(Electrode Foil)

The anode foil and the cathode foil are long film bodies made of valve action metal. The valve action metal may be aluminum, tantalum, niobium, niobium oxide, titanium, hafnium, zirconium, zinc, tungsten, bismuth, and antimony, etc. The purity thereof is desirably 99.9% or more for the anode foil, and is desirably 99% or more for the cathode foil, however, impurities such as silicon, iron, copper, magnesium, and zinc, etc., may be included thereto.

The anode foil and the cathode foil are sintered bodies which are formed by sintering powder of the valve action metal, or etched foils which are formed by performing an etching process on elongated foils. That is, the porous structure is formed by tunnel-shaped pits, spongy pits, and voids between dense powder. Typically, the porous structure is formed by a direct current etching or an alternating current etching in which a direct current or an alternating current is respectively applied to foil in an acidic aqueous solution having halogen ions, such as hydrochloric acid, or formed by vapor depositing or sintering metal particles, etc., to a core portion. Note that, since a surface of the cathode foil has less effect on capacitance of the electrolytic capacitor when compared with a surface of the anode foil, a surface roughness of the cathode foil by the porous structure may be low.

Typically, the dielectric oxide film is an oxide film formed on a surface layer of the anode foil, and when the anode foil is made of aluminum, the dielectric oxide film is an aluminum oxide film layer formed by oxidizing the porous structure. Also, the dielectric oxide film layer may be formed on the cathode foil. The dielectric oxide film layer is formed by performing a chemical treatment process in which voltage is applied to the foil in solution without halogen ions, such as acid like ammonium borate, ammonium phosphate, and ammonium adipate, etc., or aqueous solution of acid thereof.

(Separator)

The separator may be a cellulose such as kraft, Manila hemp, esparto, hemp, or rayon, and mixed paper thereof, a polyester resin such as polyethylene terephthalate, polybutylene terephthalate, polyethylene naphthalate, and derivatives thereof, a polytetrafluoroethylene resin, a polyvinylidene fluoride resin, a vinylon resin, a polyamide resin such as aliphatic polyamide, semi-aromatic polyamide, and aromatic polyamide, a polyimide resin, a polyethylene resin, a polypropylene resin, a trimethylpentene resin, a polyphenylene sulfide resin, an acryl resin, and a polyvinyl alcohol resin, etc., and these resins may be used separately or may be mixed together.

(Gel Electrolyte)

To produce the gel electrolyte, a gelation agent produced by mixing monomers, a crosslinking agent, and a polymerization initiator is added to the electrolyte solution, and the mixture is heated or irradiated with light. Monomer is a constituent unit of a polymer. One or both of 2-hydroxyethyl methacrylate and methacrylic acid respectively illustrated by the below formulae (1) and (2) are used as monomers.

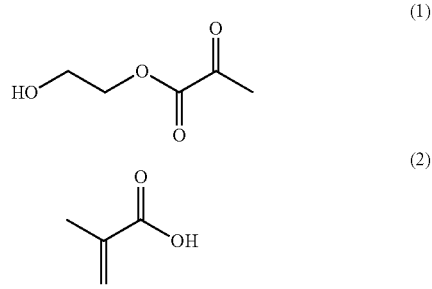

These monomers have double bonds on their ends. These monomers are polymerized in linear chain by radical polymerization of double bonds of methacryl group at the ends. That is, the polymer chain has a long linear shape. Furthermore, the polymers are crosslinked with each other by the crosslinking agent, and form 3D network structure.

Bifunctional acrylate, bifunctional methacrylate, bifunctional acrylamide, multifunctional acrylate, multifunctional mathacrylate, or multifunctional acrylamide may be used as the crosslinking agent. 2-hydroxy-3-acryloyloxy propyl methacrylate, ethylene glycol diacrylate, diethylene glycol diacrylate, polyethylene glycol diacrylate, 9,9-bis[4-(2-acryloyloxyethoxy)phenyl]fluorene, tricyclodecane dimethanol diacrylate, 1,10-decanediol diacrylate, 1,6-hexanediol diacrylate, 1,9-nonanediol diacrylate, dipropylene glycol diacrylate, tripropylene glycol diacrylate, polypropylene glycol diacrylate, ethylene glycol dimethacrylate, diethylene glycol dimethacrylate, triethylene glycol dimethacrylate, polyethylene glycol dimethacrylate, tricyclodecane dimethanol dimethacrylate, 1,6-hexanediol dimethacrylate, 1,9-nonanediol dimethacrylate, neopentyl glycol dimethacrylate, glycerine dimethacrylate, polypropylene glycol dimethacrylate, N,N'-methylenebisacrylamide, N,N'-ethylenebisacrylamide, N,N'-methylenebismethacrylamide, and N,N'-(1,2-dihydroxyethylene) bisacrylamide may be cited as the bifunctional acrylate, the bifunctional methacrylate, and the bifunctional acrylamide. 2,2-bis[(acryloyloxy)methyl] propane-1,3-diyl diacrylate, 2-[(acryloyloxy)methyl]-2-(hydroxymethyl)propane-1,3-diyl diacrylate, pentaerythritol triacrylate, trimetylolpropane triacrylate, ditrimethylolpropane tetraacrylate, pentaerythritol tetraacrylate, dipentaerythritol polyacrylate, dipentaerythritol hexaacrylate, oxybis methylenebis(methanetetrayl)hexakis(methanol) hexaacrylate, trimethylolpropane trimethacrylate, and N-[tris(3-acrylamdepropoxymethyl)methyl]acrylamide may be cited as the multifunctional acrylate, the multifunctional mathacrylate, and the multifunctional acrylamide.

The electrolyte solution held in the polymer is mixed solution in which a solute is dissolved in a solvent, and an additive is added thereto. The solvent is a protic organic polar solvent or an aprotic organic polar solvent, and may be used separately or may be used in combination of two or more. The solute includes an anion component and a cation component. Typically, the solute may be organic acids and salts thereof, inorganic acids and salts thereof, or a compound of organic acid and inorganic acid and salts thereof, and may be used separately or may be used in combination of two or more. Acid that is the anion and base that is the cation may be separately added to the electrolyte solution as the solute component.

A carboxylic acid such as oxalic acid, succinic acid, glutaric acid, pimelic acid, suberic acid, sebacic acid, phthalic acid, isophthalic acid, terephthalic acid, maleic acid, adipic acid, benzoic acid, toluic acid, enanthic acid, malonic acid, 1,6-decanecarboxylic acid, 1,7-octanecarboxylic acid, azelaic acid, undecanedioic acid, dodecanedioic acid, and tridecanedioic acid, phenols, and sulfonic acid may be cited as the organic acid that is an anion component in the electrolyte solution. Also, boric acid, phosphoric acid, phosphorus acid, hypophosphorus acid, carbonic acid, and silicic acid may be cited as the inorganic acid. Borodisalicylic acid, borodioxalic acid, and borodiglycolic acid may be cited as the compound of organic acid and inorganic acid.

One or both of amines and quaternary cyclic amidinium are used as the base that is an cation component in the electrolyte solution. Methylamine, ethylamine, propylamine, dimethylamine, diethylamine, ethylmethylamine, dibutylamine, dipropylamine, trimethylamine, triethylamine, tributylamine, ethyldimethylamine, and ethyldiisopropylamine may be cited as amines. Also, 1-ethyl-2,3-dimethylimidazolinium and 1,2,3,4-tetramethylimidazolinium may be cited as the quaternary cyclic amidinium.

An ion dissociation salt having anion component of the organic acid, the inorganic acid, or the compound of organic acid and inorganic acid, and cation component of the base thereof may be added to the electrolyte solution.

In addition, monohydric alcohols, polyhydric alcohols, and oxy alcohol compounds may be cited as the protic organic polar solvent. Ethanol, propanol, butanol, pentanol, hexanol, cyclobutanol, cyclopentanol, cyclohexanol, and benzyl alcohol may be cite as the monohydric alcohols. Ethylene glycol, propylene glycol, glycerine, 2-methoxyethanol, 2-ethoxyethanol, methoxypropylene glycol, and dimethoxypropanol may be cited as the polyhydric alcohols and the oxy alcohol compounds.

Sulfones, amides, lactones, cyclic amides, nitriles, and oxides may be cited as the aprotic organic polar solvent. Dimethyl sulfone, ethylmethyl sulfone, diethyl sulfone, sulfolane, 3-methyl sulfolane, and 2,4-dimethylsufolane may be cited as the sulfones. N-methylformamide, N,N-dimethylformamide, N-ethylformamide, N,N-diethylformamide, N-methylacetamide, N,N-dimethylacetamide, N-ethylacetamide, N,N-diethylacetamide, and hexamethylphosphoric amide may be cited as the amides. γ-butyrolactone, γ-valerolactone, δ-valerolactone, N-methyl-2-pyrrolidone, ethylene carbonate, propylene carbonate, butylene carbonate, and isobutylene carbonate may be cited as the lactones and the cyclic amides. Acetonitrile, 3-methoxypropionitrile, and glutaronitrile may be cited as the nitriles. Dimethyl sulfoxide may be cited as the oxides.

Furthermore, polyethylene glycol, boric acid, complex compounds of boric acid and polysaccharide (mannite and sorbit, etc.), complex compounds of boric acid and polyhydric alcohol, borate ester, nitro compounds (o-nitrobenzoic acid, m-nitrobenzoic acid, p-nitrobenzoic acid, o-nitrophenol, m-nitrophenol, p-nitrophenol, and p-nitrobenzyl alcohol, etc.), phosphate ester, (2,2,2-trifluoroethyl)diisopropylamide phosphate, and (2,2,2-trifluoroethyl)diisoethylamide phosphate may be cited as the additive.

These additives may be utilized alone or in combination. Among above additives, it is preferable to add polyethylene glycol or complex compounds of boric acid and polyhydric alcohol for improving withstand voltage, or to add nitro compounds for absorbing gas in the capacitor. Also, for example, it is preferable to add phosphate ester, (2,2,2-trifluoroethyl)diisopropylamide phosphate, or (2,2,2-trifluoroethyl)diisoethylamide phosphate as flame retardants when using a flammable solvent such as γ-butyrolactone.

Accordingly, by using one or both of 2-hydroxyethyl methacrylic acid and methacrylic acid as the monomers, and using one or both of amines and quaternary cyclic amidinium as the cation component, withstand voltage of the gel electrolytic capacitor is improved.

Furthermore, it is preferable to use one or both of 2-hydroxyethyl methacrylic acid and methacrylic acid as the monomers, and using one or both of amines and quaternary cyclic amidinium as the cation component because an increase in ESR is suppressed when carboxylic acids and alcohols are added to the electrolytic capacitor.

The reason why the increase in ESR is suppressed may be for the following reasons, however, it is not limited to such presumed mechanism. That is, carboxylic acids and alcohols are esterized and increase ESR of the gel electrolytic capacitor. When ammonium salts are used in the electrolyte solution, 2-hydroxyethyl methacrylic acid and methacrylic acid act as catalyst to facilitate esterification. In contrast, when amines, quaternary cyclic aminidium, or salts thereof are used in the electrolyte solution, it is assumed that the catalytic action of 2-hydroxyethyl methacrylic acid and methacrylic acid is suppressed because the separation of carboxylic acid advances, and therefore the increase in ESR is suppressed.

Also, other solvent such as γ-butyrolactone, or combination of other solvents and ethylene glycol may be used. When using γ-butyrolactone as the solvent, it is preferable to use 2-hydroxyethyl methacrylic acid rather than methacrylic acid because 2-hydroxyethyl methacrylic acid can be more easily gelated.

When γ-butyrolactone is used as the solvent and boric acid is added to the electrolyte solution, it is preferable to use 2-hydroxyethyl methacrylic acid as the monomer and use one or both of amines and quaternary cyclic aminidium as the cation component. By this combination, precipitates in the electrolyte solution due to the addition of boric acid is not observed and cloudiness of the electrolyte solution is suppressed.

When using quaternary cyclic aminidium as the cation component to produce the gel electrolytic capacitor for use with low voltage, it is preferable to use γ-butyrolactone as the solvent. γ-butyrolactone has low resistivity, high conductivity, and good low temperature characteristic when compared to ethylene glycol.

A polymer amount is preferably equal to or more than 2.5 wt % and equal to or less than 55 wt % relative to the gel electrolyte. The polymer amount is an amount of the polymer excluding polymers used as the crosslinking agent and the additive in the electrolyte solution. In other words, the polymer amount is an amount of monomers in the main chain of the gel network in the gel electrolyte relative to the gel electrolyte. If the polymer amount is less than 2.5 wt %, it is difficult for the gelation to occur. If the polymer amount is more than 55 wt %, the gel electrolytic capacitor tends to have good withstand voltage, but worse capacitance (Cap) and ESR.

The addition amount of the crosslinking agent is preferably less than 45% relative to the monomer forming polymer that is the main chain of the gel network in the gel electrolyte. That is, crosslinking degree in the formula (2) below is preferably less than 45%. When more than 0.45 mol of the crosslinking agent is added to monomer of 1 mol, the withstand voltage is improved but Cap and ESR of the gel electrolytic capacitor tends to become worse.

$$\text{Crosslinking Degree (\%)} = \text{Crosslinking Agent Addition Amount (mol)/Monomer Addition Amount (mol)} \times 100 \quad (2)$$

(Method for Producing Gel Electrolytic Capacitor)

A producing method for this gel electrolyte can be changed in the case of producing a gel electrolytic capacitor without separators and in the case of producing a gel electrolytic capacitor with separators.

When producing the gel electrolytic capacitor without separators, gelation agent containing electrolyte solution formed of the monomers, the crosslinking agent, and the polymerization initiator is applied on the dielectric oxide film of the anode foil. The gelation agent containing electrolyte solution is applied in a way such that the gelation agent containing electrolyte solution would not drip and has thickness to function as the separator. The thickener such as cellulose nanofiber, polyvinyl pyrrolidone, cellulose acetate, and ethyl cellulose may be added to suppress drip and to achieve desired thickness. These thickeners utilize 2-hydroxyethyl methacrylic acid or methacrylic acid as the monomers, and do not affect withstand voltage characteristic in the case amines are used as the cation.

After the gelation agent containing electrolyte solution is applied on the anode foil, heat treatment or light irradiation treatment are performed on the anode foil. Accordingly, the gel electrolyte is produced on the anode foil. In the case of polymerization by heat treatment, the anode foil may be exposed to heat atmosphere of 125 degrees for 1 hour. In the case of polymerization by light irradiation treatment, a high pressure mercury lamp, a metal halide lamp, a high power metal halide lamp, and a LED lamp may be cited for lamps that are light sources.

After the anode foil in which the layer of gel electrolyte is in close contact with the dielectric oxide film is obtained, the anode foil and the cathode foil are faced with each other with the gel electrolyte interposed therebetween, and the layers of the anode foil, the gel electrolyte, and the cathode foil are wound together. Accordingly, a wound-type capacitor element is produced. Or otherwise, the anode foil and the cathode foil are alternately stacked with the gel electrolyte interposed therebetween. Accordingly, a stacked-type capacitor element is produced.

The capacitor element is housed in a metal outer case, and the outer case is sealed by a sealer. The material of the outer case may be aluminum alloy containing aluminum, or aluminum and manganese, or stainless steel. The sealer is formed of rubber or hard substrate. Lead terminals are connected to the anode foil and the cathode foil of the capacitor element by stitch, cold weld, ultrasonic welding, or laser welding, and is drawn out from the sealer. Then, the dielectric oxide film damaged by wounding, etc., is repaired by aging process, and the production of the gel electrolytic capacitor is completed.

On the other hand, in the case of the gel electrolytic capacitor with separators, firstly, the anode foil and the cathode foil are wound or stacked with the separators interposed therebetween to form the capacitor element. Then, the gelation agent containing electrolyte solution is charged in the outer case, and the capacitor element is impregnated with the gelation agent containing electrolyte solution. Alternatively, the capacitor element is impregnated with the gelation agent containing electrolyte solution, and then is housed in the outer case. To prevent the gelation agent containing electrolyte solution from dripping from the ends of the capacitor element, the thickener may be used even in the gel electrolytic capacitor with the separator. Furthermore, in the producing method of the gel electrolytic capacitor with separators, the gel electrolyte is formed by heating. The heating process may be performed to the capacitor element and the anode foil which are impregnated with the gelation agent containing electrolyte solution, or may be performed after the capacitor element is housed in the outer case and the outer case is sealed.

Ammonium persulfate, benzoyl peroxide, azobis(isobutyronitorile), 4,4'-azobis(4-cyanovaleric acid), dimethyl 2,2'-azobis(N-butyl-2-methylpropionate), 2,2'-azobis(N-butyl-2-methylpropionamide), 2,2'-azobis[N-(2-hydroxyethyl)-2-metylpropaneamide], 2,2'-azobis[N-(2-carboxyethyl)-2-metylpropaneamidine], 2,2'-azobus[2-(2-imidazoline-2-yl)propane], 2,2-dimethoxy-1,2-diphenylethane-1-one, 1-hydroxy-cyclohexyl-phenyl-ketone, 2-hydroxy-2-methyl-1-phenyl-propane-1-one, 2-hydroxy-1-{4-[4-(2-hydroxy-2-methyl-propionyl)-benzyl]phenyl}-2-methyl-propane-1-one, 2-methyl-1-(4-methylthiophenyl)-2-morpholinopropane-1-one, 2-(dimethylamino)-2-[(4-methylphenyl)methyl]-1-[4-(morpholinyl) phenyl]-1-butanone, bis(2,4,6-trimethylbenzoyl)-phenylphosphonoxide, methyl benzoylformate, 1,2-octanedione, 1-[4-(phenylthio)-2-(O-benzoyloxime)] ethenone, 1-(O-acetyloxime),2-isopropylthioxanthone, 2,4-diethylthioxanthene-9-one, diphenyl(2,4,6-trimethylbenzoyl)phosphine oxide, etc., may be used as the polymerization initiator, regardless of the presence of the separator.

Examples of the present disclosure are described in more detail hereafter. Note that the present disclosure is not limited to the following examples.

EXAMPLES 1 TO 4

Various characteristics of capacitors in which ethylene glycol was used as the solvent, 2-hydroxyethyl methacrylic acid or methacrylic acid were used as the monomers, and amines were used as the cation component were checked by producing gel electrolytic capacitors according to examples 1 to 4.

Firstly, electrolyte solution for reference examples 1 and 2 were prepared by using electrolyte solution shown in the table 1 below. The mixture ratio in table 1 indicates ratio of the monomers, the crosslinking agent, and the polymerization initiator before being mixed. Furthermore, gelation agent containing electrolyte solutions for examples 1 to 4 and comparative examples 1 to 3 shown in table 2 were prepared by using the electrolyte solution of table 1 and using the monomers, the crosslinking agent, and the polymerization initiator. Table 2 shows specific cations and monomers, polymer amount, and crosslinking degree used in examples 1 to 4, reference examples 1 and 2, and comparative examples 1 to 3.

Next, capacitors were produced by using respective electrolyte solution or gelation agent containing electrolyte solution. Then, Cap, ESR, ESR change rate, and withstand voltage of capacitors according to examples 1 to 4, reference examples 1 and 2, and comparative examples 1 to were measured, and results indicated in table 2 were obtained.

TABLE 1

| Compound | Mixture Ratio (wt %) |
| --- | --- |
| ethylene glycol | 90 |
| 1,6-decanedicarboxylic acid | 9 |
| p-nitrobenzyl alcohol | 1 |
| ammonium, or diethylamine, or ethylamine, or triethylamine | — |

Here, capacitors were the wound-type and have rated voltage of 450V and rated capacity of 12 μF. The aluminum foils were enlarged by the etching process, and then the dielectric oxide film was formed by the chemical conversion treatment to produce the aluminum anode foil. Also, the aluminum foils were enlarged by the etching process to produce the aluminum cathode foil. By connecting lead terminals to produced anode foil and cathode foil, and winding the foils with manila paper interposed therebetween as separators, the capacitor elements were produced.

In the preparation of the electrolyte solution, pH is adjusted by using the cation components. In examples to 4 and comparative example 1, polyethylene glycol dimethacrylate was used as the crosslinking agent. Furthermore, in examples 1 to 4 and comparative examples 1 to 3, 2,2'-azobis[N-(2-hydroxyethyl)-2-methylpropaneamide] was added as the polymerization initiator. In examples 1 to 4, polymerization reaction and crosslinking reaction were initiated by impregnating the capacitor elements with the gelation agent containing electrolyte solution, and then heating them at 125° C. for 1 hour. In comparative examples 2 and 3, polyvinyl alcohol with the polymerization degree of 1500 and the saponification degree of 99.5 mol was used.

Afterwards, the capacitor elements according to examples 1 to 4, reference examples 1 and 2, and the comparative examples of 1 to 3 were each housed in cylindrical outer cases with bottom, and the outer cases were sealed by the sealers with the lead terminals drawn out from the sealer.

Table 2 shows values of ESR at 100 kHz (20° C.) ESR change rate is a rate of ESR heated at 150° C. for 300 hours relative to the initial ESR. The withstand voltage was measured by applying constant current of 5 mA at 25° C., and checking the ascending curve of voltage-time, and voltage (V) in which first spike or scintillation has been observed in the ascending curve was considered as the withstand voltage.

Accordingly, as indicated in table 2, it was found that the gel electrolytic capacitors according to examples 1 to 4 in which the gel electrolyte was formed by using 2-hydroxyethyl methacrylic acid or methacrylic acid as the monomer, and amines as the cation component had the withstand voltage greatly improved from the reference examples 1 and 2 and the comparative examples 1 to 3. Also, it was found that the gel electrolytic capacitors according to examples 1

TABLE 2

| | Cation | Monomer | Polymer Amount (wt %) | Crosslinking Degree (%) | Cap (μF) | ESR (Ω/100 kHz) | ESR Change Rate (150° C., 300 h) | Withstand Voltage (V) |
| --- | --- | --- | --- | --- | --- | --- | --- | --- |
| reference example 1 | ammonium | | no gel (only electrolytic solution) | | 12.3 | 1.09 | 179% | 415 |
| reference example 2 | diethylamine | | no gel (only electrolytic solution) | | 12.3 | 1.47 | 105% | 436 |
| comparative example 1 | ammonium | 2-hydroxyethyl methacrylic acid | 20 | 8 | 12.0 | 2.65 | 334% | 642 |
| example 1 | diethylamine | 2-hydroxyethyl methacrylic acid | 20 | 8 | 12.1 | 3.58 | 104% | 686 |
| example 2 | diethylamine | methacrylic acid | 20 | 8 | 12.2 | 3.62 | 105% | 679 |
| example 3 | ethylamine | 2-hydroxyethyl methacrylic acid | 20 | 8 | 12.2 | 2.92 | 105% | 671 |
| example 4 | triethylamine | 2-hydroxyethyl methacrylic acid | 20 | 8 | 12.0 | 4.02 | 102% | 691 |
| comparative example 2 | ammonium | vinyl alcohol | 2.5 | — | 12.1 | 1.20 | 203% | 410 |
| comparative example 3 | ammonium | vinyl alcohol | 10 | — | 8.8 | 22.2 | 276% | 452 | to 4 had good ESR change rate when compared to capacitors according to comparative examples 1 to 3.

Furthermore, when comparing example 1 and comparative example 1, the gel electrolytic capacitor of example 1 had better ESR change rate. That is, it was considered that, while 2-hydroxyethyl methacrylic acid acted as the catalyst for esterification reaction in comparative example 1 using ammonium, catalytic action of 2-hydroxyethyl methacrylic acid was suppressed in example 1 using amines.

EXAMPLES 5 TO 11

Various characteristics of the capacitor when the polymer amount thereof has been changed was checked by the gel electrolytic capacitor according to examples 5 to 11.

Firstly, the monomers, the crosslinking agent, and the polymerization initiator shown in table 3 below was added to the electrolyte solution. Accordingly, the gelation agent containing electrolyte solutions according to examples 5 to 11 having the cations, the polymer amounts, and the crosslinking degrees shown in table 4 were prepared. Table 3 shows mixture ratio of monomers, crosslinking agent, and polymerization initiator relative to the entire amount of the electrolyte solution before being added to. pH of the electrolyte solution was adjusted using diethylamine.

Next, the gel electrolytic capacitors according to examples 5 to 11 was produced using respective gelation agent containing electrolyte solutions. The gel electrolytic capacitor according to examples 5 to 11 was produced by the same materials, same method, and the same condition, except for the composition shown in table 4. Accordingly, Cap. ESR, ESR change rate, and withstand voltage of gel electrolytic capacitor according to examples 5 to 11 were measured, and results shown in table 4 were obtained.

TABLE 3

| Compound | Parts by Weight |
|---|---|
| ethylene glycol | 100 |
| boric acid | 4 |
| mannitol | 4 |
| 1,7-octanedicarboxvlic acid | 3 |
| polyethylene glycol | 5 |
| p-nitrobenzyl alcohol | 1 |
| diethyamine | |

TABLE 4

| | Cation | Polymer Amount (wt %) | Crosslinking Degree (%) | Cap (μF) | ESR (Ω/100 kHz) | ESR Change Rate (150° C., 300 h) | Withstand Voltage (V) |
|---|---|---|---|---|---|---|---|
| example 5 | diethylamine | 2.5 | 8 | 12.1 | 1.5 | 107% | 534 |
| example 6 | diethylamine | 5 | 8 | 12.2 | 1.63 | 108% | 548 |
| example 7 | diethylamine | 10 | 8 | 12.0 | 2.76 | 104% | 678 |
| example 8 | diethylamine | 30 | 8 | 11.2 | 4.97 | 106% | 696 |
| example 9 | diethylamine | 40 | 8 | 10.3 | 10.2 | 105% | 791 |
| example 10 | diethylamine | 50 | 8 | 9.6 | 26.2 | 108% | 962 |
| example 11 | diethylamine | 55 | 8 | 8.8 | 29.4 | 106% | 998 |

Accordingly, as indicated in table 4, it was found that the withstand voltage was improved along with an increase of the polymer amount. However, along with an increase of the polymer amount, Cap tends to decrease and ESR tends to increase. Therefore, to obtain good Cap and ESR in addition to the withstand voltage, it is preferable that the polymer amount is equal to or more than 2.5 t % and equal to or less than 55 wt %.

EXAMPLES 12 TO 21

Various characteristics of the capacitors in which γ-butyrolactone was used as the solvent, 2-hydroxyethyl methacrylic acid was used as the monomers, and amines were used as the cation component were checked by producing the gel electrolytic capacitors according to examples 12 to 21.

Firstly, the electrolyte solution shown in the table 5 below was produced. Table 5 shows the mixture ratio of the monomers, the crosslinking agent, and the polymerization initiator relative to γ-butyrolactone before being mixed to. The gelation agent containing electrolyte solutions for examples 12 to 21, reference example 3, and comparative examples 4 to 6 shown in table 6 below were prepared by adding the monomer, the crosslinking agent, and the polymerization initiator to the electrolyte solution. In the preparation of the electrolyte solution, pH was adjusted by using triethylamine or ammonium shown in table 6.

In examples 12 to 21, 2-hydroxyethyl methacrylic acid was added as the monomers in the polymer amount shown in table 6. Furthermore, in examples 20 and 21, flame retardants shown in table 6 were also added to γ-butyrolactone which was flammable. In addition, gel electrolytic capacitor for comparative examples 4 to 6 were produced as comparatives using the electrolyte solution shown in table 5. The monomers of comparative example 4 were same as examples 12 to 21. In the comparative example 5, vinyl alcohol was added as the monomer. In the comparative example 6, vinyl pyrrolidone was added as the monomer.

Next, capacitors according to examples 12 to 21, reference example 3, and comparative examples 4 to 6 were produced with the same materials, same method, and the same condition as the electrolytic capacitor of example 1, except that respective gelation agent containing electrolyte solutions were used. Accordingly, Cap. ESR, ESR change rate, and withstand voltage of gel electrolytic capacitors were measured, and results indicated in table 4 were obtained.

TABLE 5

| Compound | Parts by Weight |
|---|---|
| γ-butyrolctone | 100 |
| boric acid | 4 |
| mannitol | 4 |
| 1,7-octanedicarboxylic acid | 3 |
| p-nitrobenzyl alcohol | 1 |

TABLE 6

| | Cation | Flame Retardant Type | Flame Retardant Addition Amount (wt %) | Polymer Amount (wt %) | Crosslinking Degree (%) | Cap (μF) | ESR (Ω/100 kHz) | ESR Change Rate (150° C., 300 h) | Withstand Voltage (V) |
|---|---|---|---|---|---|---|---|---|---|
| reference example 3 | triethylamine | — | — | no gel (caly electrolytic solution) | | 12.8 | 1.48 | 123% | 425 |
| comparative example 4 | ammonium | — | — | 20 | 8 | no dissolution, unmeasurable | | | |
| example 12 | triethylamine | — | — | 2.5 | 8 | 12.2 | 1.51 | 134% | 553 |
| example 13 | triethylamine | — | — | 5 | 8 | 12.3 | 1.75 | 129% | 572 |

TABLE 6-continued

| | Cation | Flame Retardant Type | Addition Amount (wt %) | Polymer Amount (wt %) | Crosslinking Degree (%) | Cap (μF) | ESR (Ω/100 kHz) | ESR Change Rate (150° C., 300 h) | Withstand Voltage (V) |
|---|---|---|---|---|---|---|---|---|---|
| example 14 | triethylamine | — | — | 10 | 8 | 12.2 | 2.21 | 121% | 621 |
| example 15 | triethylamine | — | — | 20 | 8 | 12.4 | 2.61 | 125% | 665 |
| example 16 | triethylamine | — | — | 30 | 8 | 11.1 | 3.82 | 130% | 701 |
| example 17 | triethylamine | — | — | 40 | 8 | 10.4 | 7.94 | 119% | 746 |
| example 18 | triethylamine | — | — | 50 | 8 | 10.3 | 19.1 | 122% | 835 |
| example 19 | triethylamine | — | — | 55 | 8 | 9.1 | 23.5 | 127% | 854 |
| example 20 | triethylamine | bis(2,2,2-trifluoromethyl)disopropylamide phosphate | 20 | 20 | 8 | 12.0 | 3.21 | 133% | 877 |
| example 21 | triethylamine | bis(2,2,2-trifluoromethyl)diethylamide phosphate | 20 | 20 | 8 | 11.0 | 3.26 | 129% | 684 |
| comparative example 5 | triethylamine | — | — | 5 | 8 | no dissolution, unmeasurable | | | |
| comparative example 6 | triethylamine | — | — | 15 | −9.5 | 9.5 | 20.2 | — | 467 |

Accordingly, as indicated in table 6, it was found that gel electrolytic capacitors according to examples to 21 had good withstand voltage compared to gel electrolytic capacitor of comparative example 6. Also, it was found that the gel electrolytic capacitors according to examples 12 to 21 had good ESR change rate compared to comparative example 6. That is, it was found that good withstand voltage and good ESR change rate can be obtained even when γ-butyrolactone is used as the solvent for the electrolyte solution.

Furthermore, good withstand voltage and good ESR change rate was obtained for the gel electrolytic capacitor according to examples 20 and 21. That is, it was found that good withstand voltage and good ESR change rate characteristics obtained by using one or both of 2-hydroxyethyl methacrylic acid and methacrylic acid as the monomer, and one or both of amines and quaternary cyclic aminidium as the cation component would not be hampered by the flame retardants. Note that, in comparative examples 4 and 5, ammonium and triethylamine did not dissolve to the electrolyte solution using γ-butyrolactone as the solvent.

EXAMPLES 22 AND 23

Withstand voltage of the gel electrolytic capacitors in which γ-butyrolactone was used as the solvent, 2-hydroxyethyl methacrylic acid was used as the monomers, and 1-ethyl-2,3-dimethylimidazolinium (EDMI) that is quaternary cyclic aminidium was used as the cation component were checked by producing the gel electrolytic capacitors according to examples 22 to 23.

The gel electrolytic capacitor according to examples 22 and 23 had the electrolyte solution and the cation in the table 7 below, and the monomer and the crosslinking agent were added according to polymer amount list and crosslinking agent list in table 7. Also, the gel electrolytic capacitor of reference examples 4 and 5 that are comparatives were produced according to table 7. The electrolyte solution list in table 7 shows the electrolyte solutions shown in tables 8 and 9. In parts by weight list in table 7, mixture ratio of other mixtures is shown in parts by weight relative to 100 parts by weight of γ-butyrolactone. Also, in table 7, "imidazolinium" in cation list shows 1-ethyl-2,3-dimethylimidazolinium, and in table 8 and 9, "EDMIP" in compound list indicates phthalic acid/1-ethyl-2,3-dimethylimidazolinium. Note that capacitors according to reference examples 4 and 5 were produced by the same materials, same method, and same condition as the electrolytic capacitors according to example 1, except for that only electrolyte solution is used, that is, without the addition of the monomers. However, the capacitor was a wound-type with rated voltage of 25V and rated capacity of 12 μF.

TABLE 7

| | Electrolytic Solution | Cation | Polymer Amount (wt %) | Crosslinking Degree (%) | Withstand Voltage (V) |
|---|---|---|---|---|---|
| reference example 4 | A | imidazolinium | no gel (only electrolyte solution) | | 62 |
| reference example 5 | B | imidazolinium | no gel (only electrolyte solution) | | 159 |
| example 22 | A | imidazolinium | 20 | 8 | 218 |
| example 23 | B | imidazolinium | 20 | 8 | 357 |

TABLE 8

Electrolytic Solution A

| Compound | Parts by Weight |
|---|---|
| γ-butyrolctone | 100 |
| EDM1P | 13 |
| p-nitrobenzyl alcohol | 1.3 |

TABLE 9

Electrolytic Solution B

| Compound | Parts by Weight |
|---|---|
| γ-butyrolctone | 100 |
| EDM1P | 9 |
| boric acid | 5 |
| mannitol | 5 |
| p-nitrobenzyl alcohol | 1.2 |

As indicated in table 7, the gel electrolytic capacitors according to examples 22 and 23 had withstand voltage significantly improved when compared with the electrolytic capacitors according to reference examples 4 and 5 using same electrolyte solution. Although quaternary cyclic aminidium that is used as the cation component had low withstand voltage and was mainly used for low voltage application, the withstand voltage of the capacitor was improved even with such quaternary cyclic aminidium.

EXAMPLES 24 AND 25

A condition of gel electrolyte in which boric acid was added to the electrolyte solution and 2-hydroxyethyl methacrylic acid was used as the monomers was checked by producing the gel electrolytic capacitors according to examples 24 and 25.

The gel electrolytic capacitors according to examples 24 and 25 the had electrolyte solution and the cations in table 10 below, and the monomers and the crosslinking agent were added thereto according to polymer amount list and crosslinking agent list in table 10. Also, the gel electrolytic capacitor according to comparative examples 7 and 8 that are comparatives were produced according to table 10. Note that, 2-hydroxyethyl methacrylic acid was added as the monomers in examples 24 and 25, while 2-methoxyethyl methacrylic acid was added as the monomers in the capacitors of comparative examples 7 and The electrolyte solution list in table 10 shows electrolyte solutions shown in tables 11 and 12 below. In parts by weight list in table 11 and 12, mixture ratio of other mixtures is shown in parts by weight relative to 100 parts by weight of γ-butyrolactone. As shown in tables 11 and 12, capacitors were produced by the same materials, same method, and same condition as the electrolytic capacitors of example 1, except for that boric acid was added to electrolyte solution C and boric acid was not added to electrolyte solution D.

TABLE 10

| | Electrolytic Solution | Monomer | Polymer Amount (wt %) | Crosslinking Degree (%) | Condition |
|---|---|---|---|---|---|
| example 24 | C | 2-hydroxyethyl methacrylic acid | 20 | 4 | gelated |
| comparative example 7 | D | 2-hydroxyethyl methacrylic acid | 20 | 4 | clouded |
| example 25 | C | 2-hydroxyethyl methacrylic acid | 20 | 4 | gelated |
| comparative example 8 | D | 2-hydroxyethyl methacrylic acid | 20 | 4 | gelated |

TABLE 11

| Electrolytic Solution C | |
|---|---|
| Compound | Parts by Weight |
| γ-butyroletone | 100 |
| boric acid | 4 |
| mannitol | 4 |
| 1,7-octanedicarboxylic acid | 3 |
| p-nitrobenzyl alcohol | 1 |
| triethylamine | — |

TABLE 12

| Electrolytic Solution D | |
|---|---|
| Compound | Parts by Weight |
| γ-butyrolctone | 100 |
| 1,7-octanedicarboxylic acid | 3 |
| p-nitrobenzyl alcohol | 1 |
| triethylamine | — |

As indicated in table 10, the gel electrolytic capacitor of examples 24 and 25 was gelated with any of the electrolyte solutions in tables 11 and 12. However, gel electrolyte was clouded in the capacitor of comparative example 7. That is, when boric acid was added to the combination of 2-hydroxyethyl methacrylic acid and triethylamine, there was no precipitates, and the gel electrolytes would not be clouded.

EXAMPLES 26 TO 32

Various characteristics of the capacitor when the crosslinking degree of the crosslinking agent has been changed was checked by the gel electrolytic capacitor of examples 5 to 11

Firstly, the monomers, the crosslinking agent, and the polymerization initiator were added to the electrolyte solution shown in table 13 below. Accordingly, the gelation agent containing electrolyte solution according to examples 26 to 32 were prepared according to cation list, polymer amount list, and crosslinking degrees list in table 14 below. Table 13 shows mixture ratio relative to the entire electrolyte solution before monomers, crosslinking agent, and polymerization initiator is added. In table 13, DEA indicates diethylamine. pH of the electrolyte solution was adjusted by diethylamine.

As indicated in table 14, the gel electrolyte solution according to examples 26 to 32 in which the crosslinking agent was added so that the crosslinking degree would be 0.5% to 75% was produced. The gel electrolyte solution according to examples 26 to 32 were prepared by the same materials, same method, and same condition as the electrolytic capacitors of example 1, except for the composition indicated in shown 13 and 14. Then, Cap, ESR, ESR change rate, and withstand voltage of the gel electrolytic capacitor according to examples 26 to 32 was measured, and results indicated in table 14 were obtained.

TABLE 13

| Compound | Parts by Weight |
|---|---|
| ethylene glycol | 100 |
| boric acid | 4 |
| mannitol | 4 |
| 1,7-octanedicarboxylic acid | 3 |
| polyethylene glycol | 5 |
| p-nitrobenzyl alcohol | 1 |
| DEA | |

TABLE 14

|  | Cation | Polymer Amount (wt %) | Crosslinking Degree (%) | Cap (μF) | ESR (Ω/100 kHz) | ESR Change Rate (150° C., 300 h) | Withstand Voltage (V) |
|---|---|---|---|---|---|---|---|
| example 26 | diethylamine | 20 | 0.5 | 12.1 | 1.21 | 104% | 598 |
| example 27 | diethylamine | 20 | 5 | 12.3 | 2.31 | 103% | 642 |
| example 28 | diethylamine | 20 | 20 | 12.0 | 3.72 | 105% | 681 |
| example 29 | diethylamine | 20 | 35 | 11.3 | 5.21 | 104% | 732 |
| example 30 | diethylamine | 20 | 45 | 10.6 | 7.94 | 103% | 754 |
| example 31 | diethylamine | 20 | 50 | 10.2 | 10.2 | 104% | 893 |
| example 32 | diethylamine | 20 | 75 | 8.4 | 28.4 | 106% | 925 |

As indicated in table 14, the withstand voltage of the gel electrolytic capacitor according to examples 26 to 32 were improved along with an increase in the crosslinking degrees. That is, synergetic effect of withstand voltage further being improved along with an increase in the crosslinking degrees was found. However, Cap and ESR in the gel electrolytic capacitor got worse, and ESR in gel electrolytic capacitor according to example 31 decreased. As a whole, it was found that crosslinking degree is preferable to be equal to or less than 45% in view of Cap and ESR.

EXAMPLES 33 TO 35

Various characteristics of capacitors when the thickener were added was checked by producing gel electrolytic capacitors with separators according to examples 22 to 35.

As indicated in table 15, in example 33, the gelation agent containing electrolyte solution was prepared by adding 2-hydroxyethyl methacrylic acid as the monomers, and adding cellulose nanofiber as the thickener. In example 34, the gelation agent containing electrolyte solution was prepared by adding methacrylic acid as the monomers, and adding cellulose nanofiber as the thickener. In example 35, the gelation agent containing electrolyte solution was prepared by adding 2-hydroxyethyl methacrylic acid as the monomers, and adding polyvinyl pyrrolidone as the thickener. In table 15, addition amount of the thickener is the addition amount relative to the entire gelation agent containing electrolytic capacitor.

For others, the gel electrolytic capacitors according to examples 33 to 35 were produced by the same materials, same method, and same condition as the electrolytic capacitors of examples 26 to 32. Then, Cap, ESR, and viscosity of the gel electrolytic capacitors according to examples 33 to 35 were measured, and the results shown in table 15 were obtained. The viscosity was measured at room temperature (25° C.) using a tuning folk type vibration viscometer (SV series from A & D Company, Limited).

As indicated in table 15, examples 33 to 35 had good Cap and ESR regardless of the presence and type of the thickener. That is, it was found that good Cap and ESR could be obtained even when using one or both of 2-hydroxyethyl methacrylic acid and methacrylic acid as the monomer, one or both of amines and quaternary cyclic aminidium as the cation component, and the thickener regardless of the presence and type of the thickener.

EXAMPLES 36 TO 38

Various characteristics of the gel electrolytic capacitor without separators according to examples 36 to 38 to which the thickener has been added was checked.

As shown in table 16 below, the composition of the gelation agent containing electrolyte solution according to examples 36 to 38 were the same as that of examples 33 to 35. However, the gel electrolytic capacitor according to examples 36 to 38 are without separators. That is, the gelation agent containing electrolyte solution was applied on the dielectric oxide film on the anode foil, and light irradiation treatment was performed on the anode foil to photopolymerize the monomers. In the light irradiation treatment, light was irradiated for 2 minutes by LED lamp.

Then, the anode foil and the cathode foil which the layer of gel electrolyte was in close contact with the dielectric oxide fil thereof were alternately stacked with each other with the gel electrolyte interposed therebetween to produce the stack-type capacitor element. The lead terminal was connected to this capacitor element, and the capacitor element was housed in the outer case to produce the stack-type gel electrolytic capacitor with rated voltage of 450V and rated capacity of 1.2 μm.

For others, the gel electrolytic capacitors according to examples 36 to 38 were produced by the same materials, same method, and same condition as the electrolytic capacitors according to examples 33 to 35. Then, Cap, ESR, and viscosity of the gel electrolytic capacitors according to examples 36 to 38 were measured, and the results indicated in table 16 were obtained.

TABLE 15

|  |  | Thickener | | Polymer Amount (wt %) | Crosslinking Degree (%) | Cap (μF) | ESR (Ω/100 kHz) | Viscosity |
|---|---|---|---|---|---|---|---|---|
|  | Monomer | Type | Addition Amount (wt %) |  |  |  |  |  |
| example 33 | 2-hydroxyethyl methacrylic acid | CeNF | 0.5 | 20 | 8 | 12.1 | 3.58 | 598 |
| example 34 | methacrylic acid | CeNF | 0.5 | 20 | 8 | 12.1 | 3.65 | 635 |
| example 35 | 2-hydroxyethyl methacrylic acid | PVP | 5 | 20 | 8 | 12.3 | 5.95 | 621 |

TABLE 16

|  | Monomer | Thickener Type | Addition Amount (wt %) | Polymer Amount (wt %) | Crosslinking Degree (%) | Cap (μF) | ESR (Ω/100 kHz) | Viscosity |
|---|---|---|---|---|---|---|---|---|
| example 36 | 2-hydroxyethyl methacrylic acid | CeNF | 0.5 | 20 | 8 | 1.2 | 22.5 | 598 |
| example 37 | methacrylic acid | CeNF | 0.5 | 20 | 8 | 1.2 | 23.6 | 623 |
| example 38 | 2-hydroxyethyl methacrylic acid | PVP | 5 | 20 | 8 | 1.2 | 69.7 | 621 |

In the gel electrolytic capacitors according to examples 36 to 38, the gelation agent containing electrolyte solution was applied on the anode foil with no dripping. Accordingly, as indicated in table 16, it is found that Cap and ESR was good even in the gel electrolytic capacitor without separators and with the thickener added thereto.

The invention claimed is:

1. A gel electrolytic capacitor comprising:
    an anode foil;
    a cathode foil; and
    a gel electrolyte disposed between the anode foil and the cathode foil,
    wherein:
    the gel electrolyte consists of a polymer having three-dimensional (3D) network structure and an electrolyte solution held in the polymer,
    the polymer having three-dimensional network structure is formed by polymerizing 2-hydroxyethyl methacrylate or methacrylic acid, and
    the electrolyte solution includes amines or quaternary cyclic amidinium.

2. The gel electrolytic capacitor according to claim 1, wherein the electrolyte solution includes carboxylic acid and ethylene glycol.

3. The gel electrolytic capacitor according to claim 1, wherein:
    the electrolyte solution includes γ-butyrolactone, and
    the polymer is 2-hydroxyethyl methacrylate.

4. The gel electrolytic capacitor according claim 2, to wherein the electrolytic solution includes a flame retardant.

5. The gel electrolytic capacitor according to claim 1, wherein a volume of a monomer is 2.5 wt % to 55 wt % relative to a total volume of the gel electrolyte.

6. The gel electrolytic capacitor according to claim 1, wherein:
    the polymer includes a crosslinking agent, and
    the crosslinking agent is included in the gel electrolyte so that crosslinking degree of the polymer calculated by the below formula (1) is 45% or less:

$$\text{Crosslinking Degree (\%)} = \text{Crosslinking Agent Addition Amount (mol)/Monomer Addition Amount (mol)} \times 100 \quad (1).$$

7. The gel electrolytic capacitor according to claim 1, wherein the gel electrolyte includes a thickener.

8. The gel electrolytic capacitor according to claim 2, wherein a volume of a monomer is 2.5 wt % to 55 wt % relative to a total volume of the gel electrolyte.

9. The gel electrolytic capacitor according to claim 2, wherein:
    the polymer includes a crosslinking agent, and
    the crosslinking agent is included in the gel electrolyte so that crosslinking degree of the polymer calculated by the below formula (1) is 45% or less:

$$\text{Crosslinking Degree (\%)} = \text{Crosslinking Agent Addition Amount (mol)/Monomer Addition Amount (mol)} \times 100 \quad (1).$$

10. The gel electrolytic capacitor according to claim 2, wherein the gel electrolyte includes a thickener.

11. The gel electrolytic capacitor according to claim 3, wherein the electrolytic solution includes a flame retardant.

12. The gel electrolytic capacitor according to claim 3, wherein a volume of a monomer is 2.5 wt % to 55 wt % relative to a total volume of the gel electrolyte.

13. The gel electrolytic capacitor according to claim 3, wherein:
    the polymer includes a crosslinking agent, and
    the crosslinking agent is included in the gel electrolyte so that crosslinking degree of the polymer calculated by the below formula (1) is 45% or less:

$$\text{Crosslinking Degree (\%)} = \text{Crosslinking Agent Addition Amount (mol)/Monomer Addition Amount (mol)} \times 100 \quad (1).$$

14. The gel electrolytic capacitor according to claim 3, wherein the gel electrolyte includes a thickener.

* * * * *